United States Patent [19]

Monsen

[11] Patent Number: 4,733,402
[45] Date of Patent: Mar. 22, 1988

[54] ADAPTIVE FILTER EQUALIZER SYSTEMS

[75] Inventor: Peter Monsen, Stow, Vt.

[73] Assignee: Signatron, Inc., Lexington, Mass.

[21] Appl. No.: 41,831

[22] Filed: Apr. 23, 1987

[51] Int. Cl.$^4$ .............................................. H04B 7/08
[52] U.S. Cl. .................................... 375/100; 375/14;
375/101; 455/134; 455/139
[58] Field of Search ............... 455/133, 134, 136, 137,
455/139, 303, 304; 375/12, 14, 40, 100, 101, 102

[56] References Cited

U.S. PATENT DOCUMENTS

| | | | |
|---|---|---|---|
| 4,276,653 | 6/1981 | Aarsen et al. ...................... | 455/133 |
| 4,281,411 | 7/1981 | Bonn et al. ......................... | 455/137 |
| 4,616,364 | 10/1986 | Lee .................................... | 375/100 |

Primary Examiner—Benedict V. Safourek
Attorney, Agent, or Firm—Robert F. O'Connell

[57] ABSTRACT

An adaptive filter (11) for use in a diversity receiver system (10) which includes circuitry (23, 24, 25, 26, 34) for determining the strongest received diversity signal or group of signals at each of a plurality of time delays or group of time delays and circuitry (27, 28, 29, 30, 31, 34) for calculating a weighting signal and for weighting only the strongest received diversity signal or group of signals at each of the time delays or group of time delays, the other received diversity signals at each time delay thereby being in effect weighted by zero. The weighted signals are then combined in a delay line (32, 33) having a plurality of taps at such time delays to produce an output receiver signal. In a particular embodiment, for example, the received signals are complex signals and the weights used for the strongest received diversity signal at each time delay are quantized weights selected from the group $\pm 1 \pm j$.

12 Claims, 7 Drawing Figures

ADAPTIVE FILTER EQUALIZER SYSTEMS

INTRODUCTION

This invention relates generally to data communication systems and, more particularly; to communication system receivers for use in receiving signals which have been transmitted through a time-varying frequency selective transmission medium; such as a fading multipath medium.

BACKGROUND OF THE INVENTION

In multipath transmission systems, such as those which utilize troposcatter or high frequency communication links, for example, the transmitted signal is conveyed through a medium along a plurality of paths of differing lengths so that a plurality of signals, each representing the transmitted signal but having varying energy contents, are received at the receiver at different times depending on the length of each particular transmission path in the medium. In some applications redundant, or diversity, channels each containing a plurality of differing path lengths are used to decrease the vulnerability to fading effects.

A general discussion of such communication systems and the problems associated therewith can be found in the paper "Fading Channel Communications" by Peter Monsen, published in IEEE Communications Magazine, January 1980, pages 16–25. Such paper discusses general approaches to receivers for use in such circumstances and particularly discusses various prior art approaches to adaptive receiver structures, particularly for reducing the effect of intersymbol interference.

A more specific discussion of a particular communications receiver for processing received diversity signals and eliminating intersymbol interference is described in U.S. Pat. No. 3,879,664, issued on Apr. 22, 1975 to Peter Monsen. In such system the receiver utilizes a forward adaptive filter equalizer, having a plurality of weighting sections, in each of the receiver diversity channels for processing each of the received diversity signals. The combined weighted output signal is used to reconstruct the transmitted data and to generate an error signal. The error signal is used to derive appropriate adaptive weighting signals for use in the processing of the received diversity signals at each of the forward filter equalizers.

The forward filter equalizers generally use tapped delay lines to provide for appropriate matched filtering of the received signals. The delay lines are arranged so as to have a sufficient number of taps to capture as much of the useful energy of the pulses in the currently received signals as possible and to tend to cancel, or to significantly reduce, the cross-talk from succeeding pulses (i.e., to reduce future intersymbol interference). The system may further utilize a backward filter, also known as a decision feedback equalizer circuit, which suitably processes the reconstructed data to form a cancellation signal which is effectively used to eliminate past intersymbol interference (i.e., cross talk from preceding pulses). The same error signal is also used to derive appropriate weighting signals in the backward filter equalizer.

In a typical practical embodiment of such a system, the tapped delay line in each forward filter equalizer uses multiple taps spaced at less than the Nyquist interval in order to accomplish the two functions of signal energy capture and of future intersymbol interference cancellation, as described. for example, in U.S. Pat. No. 3,633,107, issued on Jan. 4, 1972 to D. M. Brady. It has been subsequently suggested that better performance can be achieved by treating the energy capture problem separately from the intersymbol interference problem. Such systems are described in U.S. Pat. No. 4,271,525, issued on June 2, 1981 to Kojico Watanabe, and in U.S. Pat. No. 4,328,585, issued on May 4, 1982 to Peter Monsen. In such systems, the matched filtering process for effectively capturing signal energy is separated from the future intersymbol interference correction process by utilizing independent circuits for performing each function.

As described in U.S. Pat. No. 4,271,525, for example, a diversity combining filter utilizing a plurality of separate adaptive matched filters using multiple tapped delay lines within each diversity channel performs the matched filtering process by producing a time reverse of the impulse response of the channel yielding the input signals thereto, the outputs of said matched filters being appropriately combined, as by summing, to produce a combined matched filter output. U.S. Pat. No. 4,328,585 improves on this concept by using a lattice filter to speed up adaptation of the intersymbol interference cancellation function. Thus, a single suitable intersymbol interference correction equalizer circuit utilizing a single multiple tapped delay line is used to respond to the combined matched filter output for performing intersymbol interference elimination separately from the diversity combining matched filter process of the system.

In implementing practical versions of such systems, matched filters are used for each diversity branch of the diversity system each matched filter using a delay line having multiple taps, while the single intersymbol interference correction equalizer also uses a single multiple tapped delay line. The diversity signals at each tap are weighted and combined, all of the weighted signals at all of the taps then being further combined at the output of the delay line to produce an output signal for supplying to the intersymbol interference correction equalizer circuit.

Relatively complicated weighting circuitry is utilized at the matched filters for providing the desired weights for each of the diversity signals which are combined to supply the weighted signals at each of the delay line taps. Relatively precise weight calculations are used to provide the desired improved performance characteristics.

In some applications, however, it is desirable to simplify even further the complicated weighting techniques used in such systems while still maintaining reasonable and aceptable performance characteristics.

BRIEF SUMMARY OF THE INVENTION

In accordance with the invention, the adaptive matched filters used in each of a plurality of diversity branches are arranged so as to determine which particular diversity signal is the strongest at each delay or group of delays of a time delay combining circuit, e.g., at each tap of a delay line. The adaptive matched filter at each delay then calculates the weight required only for that particular diversity signal which is selected as the strongest at each selected delay and weights all other diversity signals at the other delays by zero. Moreover, it has been found that in a particular embodiment of the invention, for example, the weights used for each particular selected diversity signal at each delay need not be precisely calculated but can be calculated with much less precision without adversely affecting the system performance to any significant extent. Even further, it has been found that in a particular embodiment of the invention, the less precise calculated weights for the selected strongest diversity signal at each delay can be replaced by discretely quantized weighting values, e.g., by $\pm 1$, so that, in effect, the signs of the diversity signals are changed to effect the weights thereof. In a system in which the signals have both real and imaginary components the complex weights at the selected branch for each delay can be simply selected from the group $\pm 1 \pm j$, i.e., from one of the four weights: $+1+j$, $+1-j$, $-1+j$ and $-1-j$.

By using simple quantized weight coefficients in the form $\pm 1 +j$ the multiplier circuits formerly required can be replaced by much less expensive sign multiplier circuits e.g., circuits requiring only a single bit to determine the sign, although some additional circuitry is needed to account for the phase rotations implied by the use of the four possible sign combinations therein. Since the receiver does not know, a priori. which diversity signal to use at each delay, in order to determine the strongest diversity signal, the transmitter during a reference mode of operation sends a known reference signal many times during each fade period. The receiver uses this reference signal to sequentially calculate the strength and phase shift of each delay on each diversity branch and thereby make the determination of the strongest signal during each such reference mode of operation. In its simplest embodiment, for example, once the weights are set for each selected delay, during the message mode of operation the matched filter circuitry responds to the message signal to provide the desired output signal for supply to the intersymbol interference correction circuitry.

Thus, the weighting technique for the matched filter circuitry becomes much less complicated, and less costly, without unduly degrading the operation of the system for many applications.

DESCRIPTION OF THE INVENTION

The invention can be described in more detail with the help of the accompanying drawings wherein FIG. 1 shows a broad block diagram of a diversity receiver system in accordance with the invention;

Figure 1:
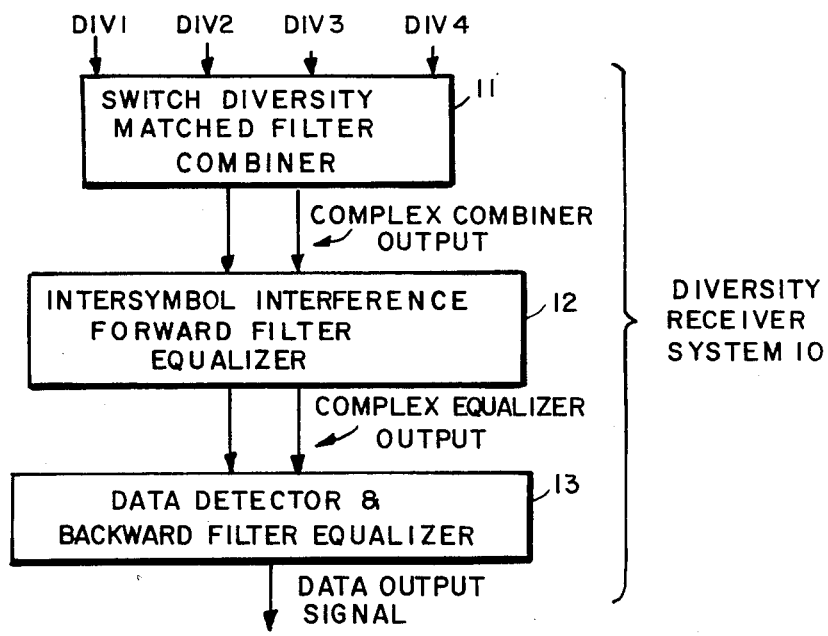

As can be seen in FIG. 1, a portion of an overall diversity receiver system 10 is depicted for a quadruple diversity system having four diversity signal channels identified as DIV 1 through DIV 4. The signals are at an i-f frequency and are received via suitable antennas and r-f frequency circuitry following conversion from r-f to i-f frequency. Such signals are supplied to switch diversity matched filter combiner circuitry 11 which provides a complex output signal (i.e., one having real and imaginary components corresponding to the in-phase and quadrature components of the signal), in a manner discussed in more detail below. The complex output matched filter component signals are supplied to a forward filter equalizer circuit 12 of the type discussed, for example, in the aforesaid Monsen U.S. Pat. No. 4,328,585 for providing future intersymbol interference cancellation. The complex output therefrom can be in turn supplied to a data detector and backward filter equalizer (for providing past intersymbol interference cancellation) also as disclosed in the aforesaid Monsen patent.

The switch diversity matched filter combiner circuitry 11 operates in a novel manner when compared to matched filter combiner circuits of the prior art, such as shown in the aforesaid Monsen patent. Such operation can be described, for example, with reference to FIGS. 2 through 7.

Figure 2:
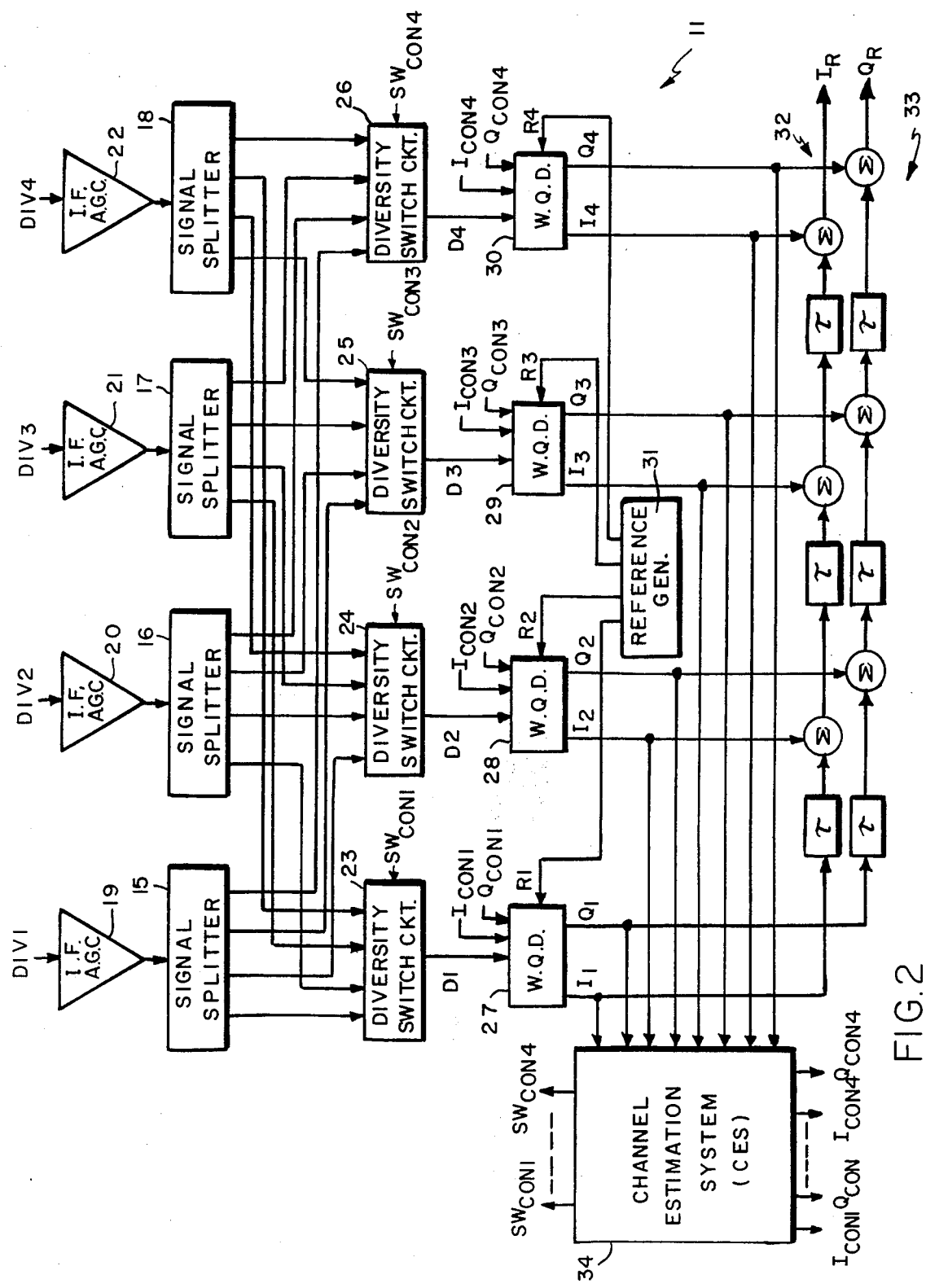
FIG. 2 shows a block diagram in more detail of an embodiment of the switch diversity matched filter combiner of FIG. 1.
Figure 4:
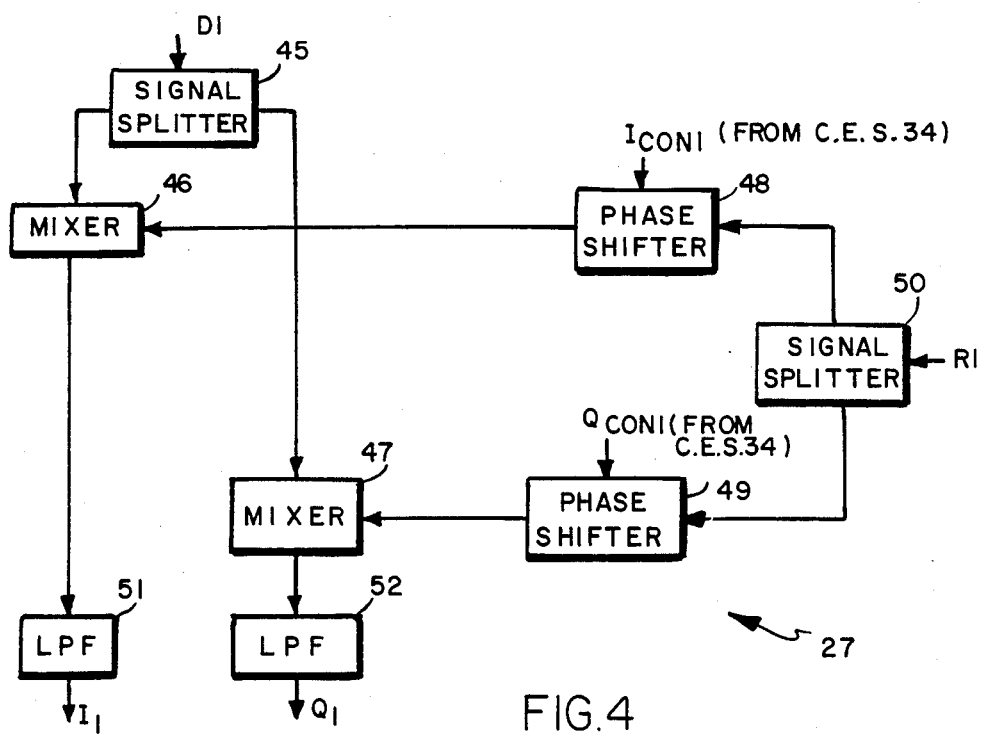
FIG. 4 shows a block diagram in more detail of a typical weighted quadrature demodulator of FIG. 2.

FIG. 2 depicts an overall switch diversity matched filter combiner 11 in which each of the four diversity signals DIV 1 through DIV 4 is supplied to a conventional signal splitter circuit 15-18, respectively, via conventional I.F. amplifiers with automatic gain control (AGC) circuits 19-22, respectively. Outputs from each of the signal splitter circuits, each associated with a particular received signal time delay, are supplied during a reference operating mode to each of four diversity switch circuits 23-26 for selecting the strongest antenna signal at each such time delay or group of time delays, such selection being controlled by switch control signals $SW_{con}$ 1–$SW_{con}$ 4, respectively, as shown and discussed in more detail below.

Each of the outputs $D_1$–$D_4$ selected by diversity switches 23-26 as the strongest at each time delay is supplied to an associated weighted quadrature demodulator (WQD) circuit 27-30 and is correlated during a reference mode of operation at each time delay with a suitably selected reference signal $R_1$–$R_4$, as discussed in more detail below. Such reference signals are derived from the correlation of a reference source signal at the receiver with a reference signal from the transmitter synchronized thereto at reference generator 31. The correlations of the outputs $D_1$–$D_4$ with the suitably selected reference signals $R_1$–$R_4$ at circuits 27-30 are supplied to corresponding taps of the in-phase and quadrature delay lines 32 and 33 as the effective tap gains at the taps. In this manner the strongest diversity signals and their channel tap gain estimates are generated for each of the four tap delay cells of the delay lines, the outputs of which are in-phase and quadrature signals weighted by one of the weights, $\pm 1 +j$, as appropriate, for supply to the forward filter equalizer 12.

The operation of AGC amplifier circuits 19-22 and the signal splitter circuits 15-18 are conventional and well-known and need not be described in more detail. A typical diversity switch circuit, e.g., for DSW circuit 23, is shown in more detail in FIG. 3, while a typical weighted quadrature demodulator, e.g. WQD circuit 27, is depicted in more detail in FIG. 4.

Figure 5:
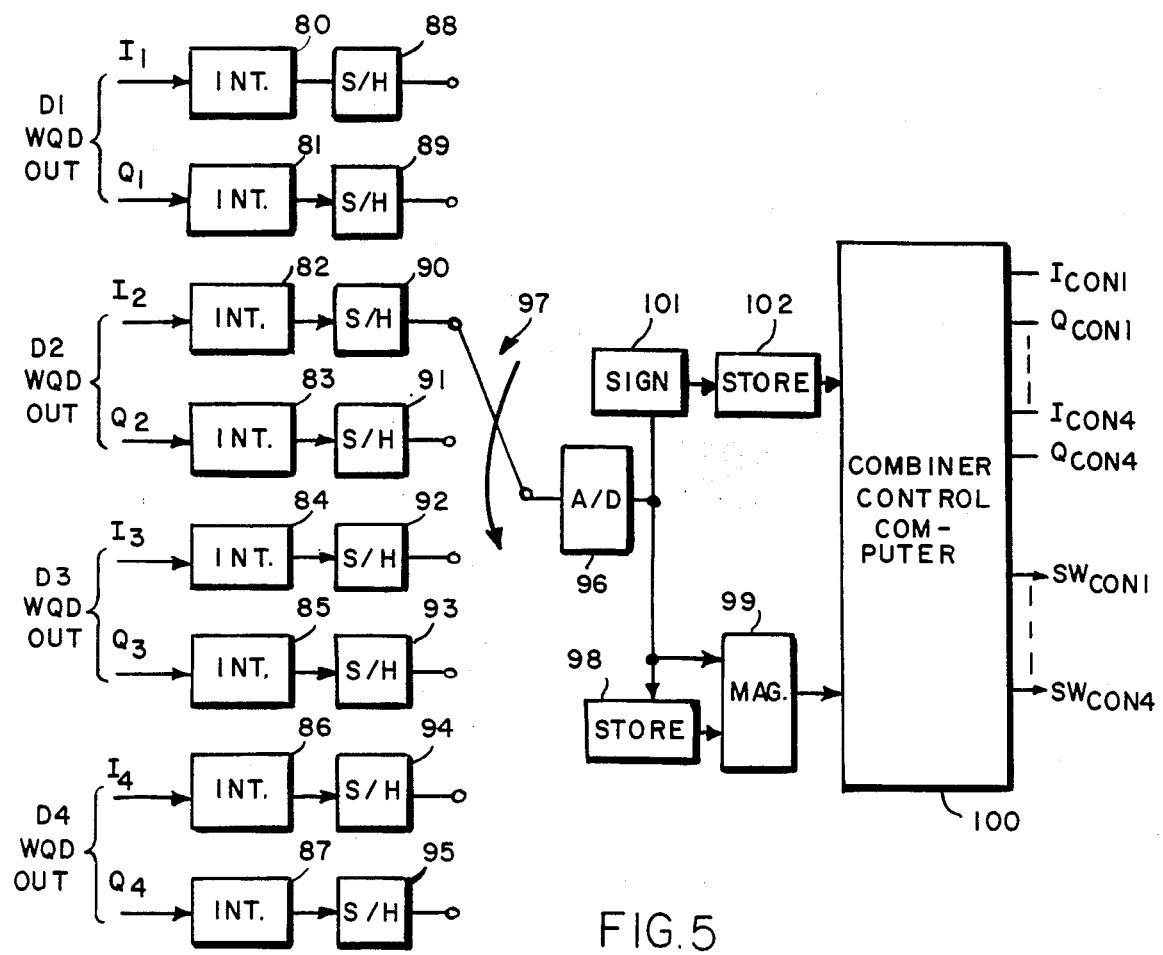
FIG. 5 shows a block diagram in more detail of an embodiment of the channel estimation system of FIG. 2.
Figure 6:
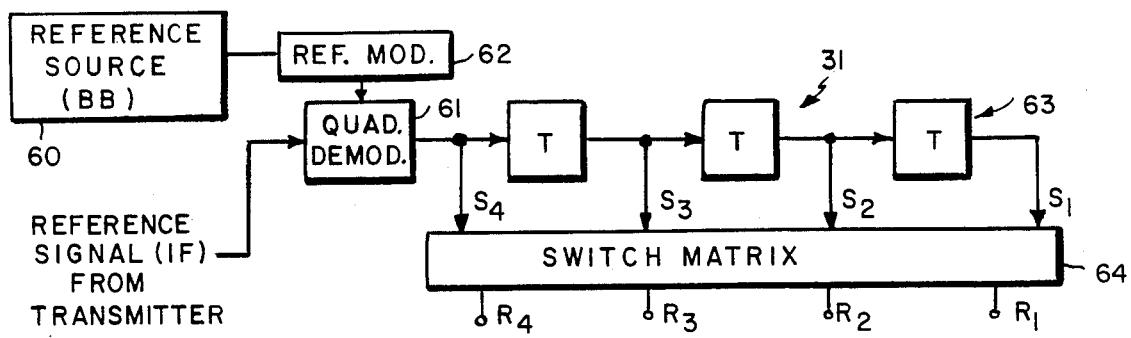
FIG. 6 shows a block diagram in more detail of the reference generator of FIG. 2.
Figure 7:
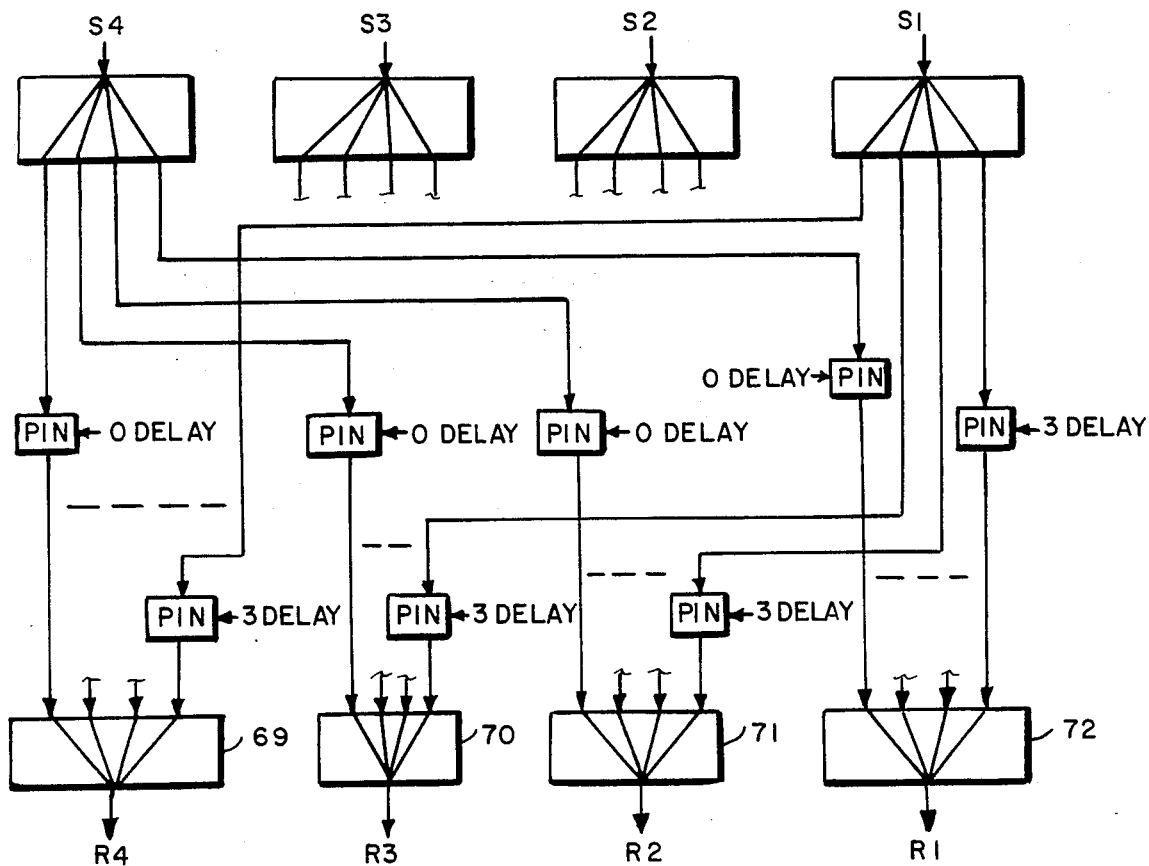
FIG. 7 shows a block diagram in more detail of the switch matrix in the waveform signal generator of FIG. 6.

Channel estimation circuitry 34 used during the reference mode for providing the required control signals is depicted in more detail in FIG. 5, while the reference generator 31 is shown in more detail in FIG. 6, together with a chart depicting the connections required during the message and reference operating modes. A more detailed description of the switch matrix for switch circuits 23 through 26 is depicted in FIG. 7. The operation of the circuitry shown in FIGS. 2 through 7 is discussed in more detail below.

Figure 3:
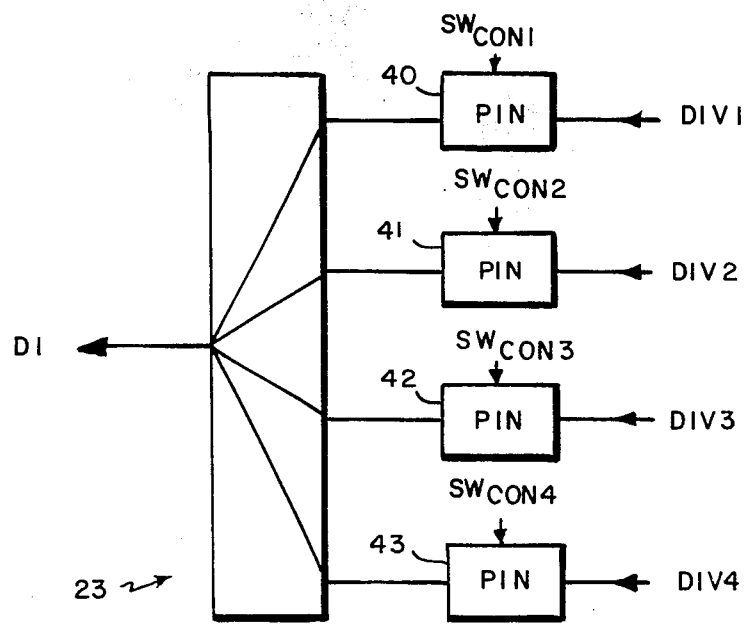
FIG. 3 shows a block diagram in more detail of an embodiment of a typical diversity switch circuit of FIG. 2.

For a quadruple diversity system at the i.f. frequencies involved, relatively high speed switching is required in selecting the strongest diversity signal at each delay. An exemplary circuit is shown in FIG. 3 for a typical diversity switch circuit, e.g., switch circuit 23 of FIG. 2. As can be seen therein, each circuit uses PIN diodes 41 through 43, the diversity signals DIV 1 through DIV 4 being supplied thereto as shown and the diode operation being controlled by a particular selected control signal $SW_{con\ 1}$ through $SW_{con\ 4}$ supplied by estimation circuit 34 during the reference mode of operation. Accordingly, the strongest diversity's input signals as selected during the reference mode of operation assures that the strongest diversity's input signals are also supplied during the message mode of operation at the output as signal D1 for the undelayed input in the switch circuit 24. Similar circuits supply the strongest diversity signals from signals D2 through D4 with reference to each of the other delays ($\tau$, $2\tau$, and $3\tau$) with which circuits 24, 25 and 26 are associated.

The signals D1 through D4 are supplied to their corresponding weighted quadrature demodulators (WQD) 27 through 30, a typical one of which, e.g.. WQD 27, is shown in more detail in FIG. 4. The selected diversity input signal D1, for example. is supplied via a signal splitter of 45 to a pair of mixers 46 and 47, one for the in-phase (I) signal and one for the quadrature (Q) signal component of signal D1, where they are mixed with I and Q weighted signals from phase shifters 48 and 49, respectively. The weights are selected for the in-phase and quadrature components as one of the values $\pm 1\ \pm j$, as mentioned above, which weights are determined during the reference mode. The selection of the weights involved depends on the phase relationships of the $I_{con1}$ and $Q_{con1}$ signals received from channel estimation circuit 34 and the corresponding reference signal R1 from reference generator 31 supplied to the phase shifter via signal splitter 50. During the message operating mode weighted I and Q components of the strongest diversity input signal are supplied to in-phase and quadrature tapped delay lines 32 and 33 via low pass filters 51 and 52 as output signals $I_1$ and $Q_1$ from the undelayed WQD 27. Similar weighted in-phase and quadrature components are supplied to the delay lines from weighted quadrature demodulators WQD 28, WQD 29 and WQD 30.

The I and Q outputs from the weighted quadrature demodulators 27 through 30 are used when the system responds to a reference signal during the reference mode in determining the various control signals provided by channel estimation circuit 34 as discussed below. During the message operating mode, once such weights are set, such outputs are supplied as the I and Q input components at each of the tapped delay inputs of delay lines 32 and 33, where they are combined to provide the receiver output in-phase and quadrature components $I_R$ and $Q_R$, as shown in FIG. 2, for use at the forward filter equalizer circuit 12 of FIG. 1.

The reference generator 31 is discussed with reference to FIGS. 6 and 7. As seen in FIG. 6, a reference signal having a known base band waveform (e.g., a square wave) and being modulated at intermediate frequency (IF) is received from a transmitter during a reference mode of operation. A base band reference signal having the same waveform is generated at the receiver at reference source 60 and is also modulated at IF by a reference modulator 62. The transmitter and receiver reference signals are appropriately synchronized prior to communication using synchronizing techniques well known to those in the art. Such reference signals are supplied to a quadrature demodulator 61 to provide a correlated demodulated output therefrom which is supplied to a tapped delay line 63, the delays of which correspond to those of delay lines 32 and 33 to provide the signals $S_1$, $S_2$, $S_3$, and $S_4$ from tapped delay line 63. During a reference mode the correlation process supplies the correlated signals from delay line 63 to a switching matrix circuit 64 to produce a plurality of receiver reference signals $R_1$, $R_2$, $R_3$, and $R_4$ for supply to the appropriate weighted quadrature demodulators 27 through 30.

As can be seen in the chart accompanying FIG. 6, during the reference burst signal mode, it is necessary to correlate each of the four diversity signals with each of the four possible delay shifted waveform signals. The combinations thereof are shown in the chart of FIG. 6. The switching involved is shown by the switching matrix of FIG. 7 in which sixteen PIN diodes are used as shown, their operations being controlled in accordance with a corresponding delay (0 delay . . . 3 delay), the outputs $R_1$ through $R_4$ at each delay being supplied via units 69 through 72. During the message operating mode, each reference signal output is connected to its corresponding delay channel of the combiner, i.e., $S_4$ to $R_4$, $S_3$ to $R_3$, etc.

Channel estimation circuit 34 is shown in more detail in FIG. 5. During the reference mode of operation, in response to the incoming reference signal at the diversity inputs, each in-phase and quadrature output ($I_1$, $Q_1$, $I_2$, $Q_2$ . . . ) from WQD circuits 27 through 30 is integrated by one of integrators 80 through 87, respectively, the integrated outputs of which are supplied to sample and hold (S/H) circuits 88 through 95. The analog outputs of S/H units 88 through 95 are converted to digital signals at A/D converter 96 as they are consecutively switched thereto via multiplexer switch 97. If each symbol period is K seconds, the multiplexer switch 97 rotates through all of its eight positions in K seconds.

As the outputs are stored in stores 102 and 98, the magnitudes are compared in order to determine the strongest diversity input signal via magnitude comparison circuitry 99 and at each delay the appropriate switch control signal ($SW_{con\ 1}$ through $SW_{con\ 4}$) is provided by a suitable control processor 100 to activate the PIN diode corresponding to such strongest signal at each particular delay. Further, for the digitized in-phase and quadrature components of the integrated values, the signs of each are determined by sign unit 101 and are stored and used in the reference mode to determine the phase shifted values $I_{con\ 1}$ through $I_{con\ 4}$ and $Q_{con\ 1}$ through $Q_{con\ 4}$ quantized to 0° or multiples of 90° for use in the weighted quadrature demodulators 27 through 30. During the message operating mode the phase shifters remain fixed in the positions set during the reference operating mode.

While a particular embodiment of the invention is discussed above with reference to FIGS. 2 through 7, modifications thereof may occur to those in the art within the spirit and scope of the invention.

For example, while the specific embodiment described above selects the strongest diversity signal at each time delay, in some applications it may be desirable to select more than one signal at each delay, e.g.. the two strongest signals, or some other number of the stronger signals less than the total number of diversity signals, and to weight such selected number of signals appropriately at each delay in the manner discussed above.

Moreover, while the weighting and demodulation is performed at each delay, the weighted and demodulated quadrature signals being summed using a delay line as described above, in some applications it may be desirable to perform the weighting and summing operations in undemodulated form and then to perform the demodulation operation on each of the summed quadrature signals at the outputs of the delay lines.

Further simplification can also be provided, for example, by merely selecting the single strongest diversity signal as received at the input and using such selected diversity signal at each time delay, appropriatelky weighting only that diversity signal at each delay rather than making a selection of the strongest diversity signal for each time delay.

It is also understood that the system of the invention can be used for systems which employ spread spectrum transmitter signals or systems which do not use spread spectrum techniques.

All of the above exemplary modifications of the invention are intended to be included in the inventive concept. Accordingly, the invention is not to be construed as limited to the specific embodiment disclosed herein except as defined by the appended claims.

What is claimed is:

1. A communications receiver system for receiving message signals transmitted through a multipath medium, said system comprising
    a plurality of diversity receivers each receiving one of a plurality of received diversity message signals from a message signal transmitted through said medium;
    a plurality of switching means each associated with a different received signal time delay and responsive to said plurality of received diversity message signals for providing as a switching output signal therefrom the strongest signal or group of signals of said plurality of received diversity message signals at said associated time delay;
    a plurality of weighting means each responsive to the switching output signal from a corresponding one of said switching means and to a weighting signal for providing a weighted output signal;
    means for providing a said weighting signal to each of said weighting means; and
    output time delay means responsive to the weighted output signals from said weighting means at each said associated time delay for combining said weighted output signals to provide a received output message signal therefrom.

2. A system in accordance with claim 1 wherein said weighting signal providing means provides a quantized weighting signal for each of said weighting means.

3. A system in accordance with claim 1 wherein said received diversity signals are complex signals and said weighting signal providing means provides a complex weighting signal for each of said weighting means.

4. A system in accordance with claim 3 wherein said weighting signal providing means provides a quantized weighting signal for each of said weighting means which is selected from the group comprising $\pm 1 \pm j$.

5. A system in accordance with claim 1 wherein said diversity receivers receive, during a reference mode of operation, a plurality of received diversity reference signals from a reference signal transmitted through said medium, and said system further includes
    means for determining, from said received diversity reference signals, the strongest reference signal or signals of said plurality of received diversity reference signals at each said associated time delay or group of time delays whereby, during a message mode of operation, each of said plurality of switching means provides as a switching output signal therefrom only the strongest of said plurality of received diversity signals at each said associated time delay.

6. A system in accordance with claim 5 wherein said diversity signals are complex and said system further includes
    reference generator means for providing modulated complex components of a said reference signal at each associated time delay, and further wherein each of said weighting means includes
    means responsive to the received switching output signal from a said corresponding switching means for providing complex components of said weighted output signal;
    means responsive to the complex reference signal components for phase shifting each of said waveform signal components by a selected phase shift value;
    means responsive to the complex components of said received switching output signal and to the complex components of said reference signal for demodulating said received switching output signal components and weighting said received switching output signal components by a weighting value determined by said phase shifting means; and
    low pass filter means responsive to said demodulating and weighting means for providing said complex weighted output signal.

7. A system in accordance with claim 6 wherein said reference generator means includes
    means for providing a predetermined reference signal;
    demodulator means responsive to said predetermined reference signal and to a predetermined transmitted reference signal for providing a demodulated complex reference signal;
    reference time delay means responsive to said demodulated complex reference signal for providing a plurality of said demodulated complex reference signals at different time delays; and
    switching matrix means for providing said plurality of demodulated complex reference signals at different time delays to said weighting means.

8. A system in accordance with claim 7 wherein said reference time delay means has time delays which correspond to the time delays of said output time delay means.

9. A system in accordance with claim 6 wherein said strongest signals determining means includes
    means responsive to said plurality of received diversity reference signals during said reference mode of operation for storing the magnitudes and signs thereof at each said associated time delay; and
    means responsive to said stored magnitudes for providing a plurality of switch control signals;

said plurality of switching means responding to said plurality of switch control signals for selecting received diversity reference signals having the largest magnitude at each said associated time delays.

10. A system in accordance with claim 9 and further including means responsive to said stored signs for providing a plurality of phase shift control signals;

the phase shifting means of said weighting means responding to said phase shift control signals for selecting the phase shift value for use in phase shifting said complex reference components.

11. A system in accordance with claim 1 wherein said plurality of weighting means each include demodulation means for providing a demodulated output signal therefrom.

12. A communications receiver system for receiving message signals transmitted through a multipath medium, said system comprising a plurality of diversity receivers each receiving one of a plurality of received diversity message signals from a message signal transmitted through said medium;

means associated with each different received signal time delay for providing one or more signals selected from one or more, but less than all, of said plurality of received diversity message signals for use at each said associated time delay;

weighting means responsive to the one or more selected signals at each said time delay and to one or more weighting signals for providing one or more weighted output signals at each said time delay;

means for providing said one or more weighting signals to each of said weighting means at each said time delay; and output time delay means responsive to one or more weighted output signals from said weighting means at each said associated time delay for combining said weighted output signals to provide a received output message signal therefrom.

* * * * *